US008576414B2

(12) United States Patent
Masuyama

(10) Patent No.: US 8,576,414 B2
(45) Date of Patent: Nov. 5, 2013

(54) BOOKBINDING PROCESSING APPARATUS AND CONTROL METHOD THEREOF AND PROGRAM FOR SETTING RECOMMENDED SETTING VALUES AS THE SETTING VALUES

(75) Inventor: Yuka Masuyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 925 days.

(21) Appl. No.: 12/268,679

(22) Filed: Nov. 11, 2008

(65) Prior Publication Data

US 2009/0129893 A1 May 21, 2009

(30) Foreign Application Priority Data

Nov. 21, 2007 (JP) ................................. 2007-302078

(51) Int. Cl.
*G06F 19/00* (2011.01)

(52) U.S. Cl.
USPC ............. 358/1.13; 358/1.15; 413/13; 413/14; 413/1; 700/103

(58) Field of Classification Search
USPC .......... 358/1.13, 1.15; 413/1, 13, 14; 700/103
See application file for complete search history.

(56) References Cited

U.S. PATENT DOCUMENTS 5,485,618 A * 1/1996 Smith ........................... 715/710
7,991,853 B2 * 8/2011 Miyoshi et al. ............... 709/219
2003/0066027 A1 4/2003 Nakagiri
2004/0190057 A1 9/2004 Takahashi et al.
2005/0113136 A1 * 5/2005 Gosieski, Jr. .............. 455/556.1
2006/0221385 A1 * 10/2006 Ohara et al. ................. 358/1.15
2007/0201091 A1 * 8/2007 Tanaka ......................... 358/1.16
2007/0250535 A1 10/2007 Morikawa et al.
2008/0088875 A1 * 4/2008 Taira ............................ 358/1.15

FOREIGN PATENT DOCUMENTS

JP 11-296324 * 10/1999
JP 2000-341476 A 12/2000
JP 2001-142667 A 5/2001
JP 2001-257810 A 9/2001
JP 2001-285534 A 10/2001
JP 2003-091384 A 3/2003
JP 2004-310746 A 11/2004
JP 2004-310747 A 11/2004
JP 2004-326426 A 11/2004
JP 2007-279131 A 10/2007
JP 2007-283717 A 11/2007

OTHER PUBLICATIONS

Machine translation for JP 11-296324.*

(Continued)

*Primary Examiner* — Qian Yang
(74) *Attorney, Agent, or Firm* — Fitzpatrick, Cella, Harper & Scinto

(57) ABSTRACT

A bookbinding processing apparatus capable of setting values for each item of post-processing functions on printed sheets and a control method thereof display, on a display unit, an operation screen for inputting setting values for each item of post-processing functions, and an setting value for each item is input using the operation screen. When inputting a setting value for a first item, giving the instruction to display an recommended setting value for the first item and items thereafter causes a display unit to display a list of recommended setting values for the first item input on the operation screen and for the other items, recommended setting values selected on the list are displayed, and setting values for items previously input on that setting screen can be validated and printing is started.

11 Claims, 16 Drawing Sheets

(56) References Cited

OTHER PUBLICATIONS

Office Action dated Jan. 17, 2012, in counterpart Japanese Patent Application No. 2007-302078.

Office Action dated Apr. 4, 2012, in counterpart Japanese Patent Application No. 2007-302078.

Office Action dated Jun. 25, 2012, in counterpart Japanese Patent Application No. 2007-302078.

* cited by examiner

BOOKBINDING PROCESSING APPARATUS AND CONTROL METHOD THEREOF AND PROGRAM FOR SETTING RECOMMENDED SETTING VALUES AS THE SETTING VALUES

BACKGROUND OF THE INVENTION

1. Field of the Invention

The present invention relates to a bookbinding processing apparatus and control method thereof and program.

2. Description of the Related Art

In the printing industry, publications are published by carrying out various steps. These steps include receiving manuscripts, applying a design to the manuscripts, editing the layout, comps (presentations based on printing), proofing (layout corrections and color corrections), press proofs (proof printing), plate making, printing, post-processing tasks, delivery, and so on.

Thus far, in the conventional printing industry, offset plate printing presses have been used in the printing process, necessitating the plate making process. However, it is not easy to perform corrections on these plates once they have been created, and such corrections also incur significant expense. Therefore, careful proofing (that is, work involving careful layout checks and color confirmations) is essential when creating plates. For this reason, it has taken considerable time in order to publish such publications. Furthermore, the devices used in each step are often large-scale devices, requiring expert knowledge to operate, and thus the expertise of an experienced operator has been indispensable.

In response to this situation, a POD (print-on-demand) system that uses electro-photographic printing apparatuses, inkjet printing apparatuses, and so on has recently been proposed (see Japanese Patent Laid-Open 2004-310746, 2004-310747). Using such a POD system, the need for plate making and other complicated processes mentioned above is obviated.

However, there remains room for investigation when envisioning practical application of such POD systems. For example, the number of types of post-processing apparatuses such as a trimmer, bookbinding device, and so on, connected to the printing apparatus, will increase, and the number of functions to be set on the printing apparatus for those post-processing apparatuses will also increase. Further, not only will the number of types of post-processing apparatuses connected to the printing apparatus increase, but the number of settable items for each post-process will also increase. For this reason the operation to set each type of setting for the post-processes will become complicated for the user, and expert knowledge and experience will be necessary to set appropriate values to obtain an expected result.

In particular, in the case of case binding, which has a large number of items to set, settings beginning with finish size, original size, and cover size, as well as cutting width, cutting angle, and other settings can be set from an operation screen of a printing apparatus. However, these setting values must be within respective limit values inherent to case binding. For this reason, when a value that does not satisfy the limit values is set, an error warning is displayed on the operation screen of the printing apparatus. In this case, while it is desirable to clearly describe a correction method for the settings on the warning screen, when a plurality of setting values are handled, the method for indicating a correction method becomes complicated.

Further, even if the set setting values are enumerated and displayed, simply displaying them causes readability to deteriorate as the number of settable items increases, and it takes a long time for the user to select a desired setting value. In this manner, while fine settings can be made using processing that allows input of a plurality of setting items, enabling a user to create a desired output document, it is extremely difficult to set those appropriate setting values.

SUMMARY OF THE INVENTION

An aspect of the present invention is to eliminate the above-mentioned problems with the conventional technology.

It is an aspect of the present invention to provide technology to allow a user to easily set setting values for each item of post-processing functions.

According to an aspect of the present invention, there is provided a bookbinding processing apparatus for setting a setting value for each item of a post-processing function for printed sheets, the apparatus comprising: a display unit configured to display each operation screen for inputting a setting value of each item of the post-processing function; an input unit configured to be operable to input the setting value of each item using each operation screen; an instruction unit configured to, when inputting a setting value of a first item by the input unit using a first operation screen, give an instruction to display recommended setting values for the first item and items other than the first item; a display control unit configured to display a list of recommended setting values for the first item and items other than the first item input on the first operation screen on the display unit, according to the instruction from the instruction unit; a print start unit configured to validate an recommended setting value selected on the list of the recommended setting values and other item setting values previously input through an operation screen, and to start printing; and a reception unit configured to validate the recommended setting value selected on the list of the recommended setting values, return to the first operating screen, and receive inputs input through the input unit.

Further features of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

The bookbinding processing apparatus according to an exemplary embodiment of the present invention enables setting values for items of each function to be easily set by using recommended setting values (default values) and settings in a job log when making settings of finishing process that require complicated settings, even when the user has no knowledge or experience. By using or referring to values from these recommended setting values and the settings in the job log, a user can easily input setting values.

Further, the user can call a default value guide at a desired timing, or change a displayed default value in response to a called timing, increasing the readability of default values and allowing the user to more easily select necessary setting values.

Figure 1:
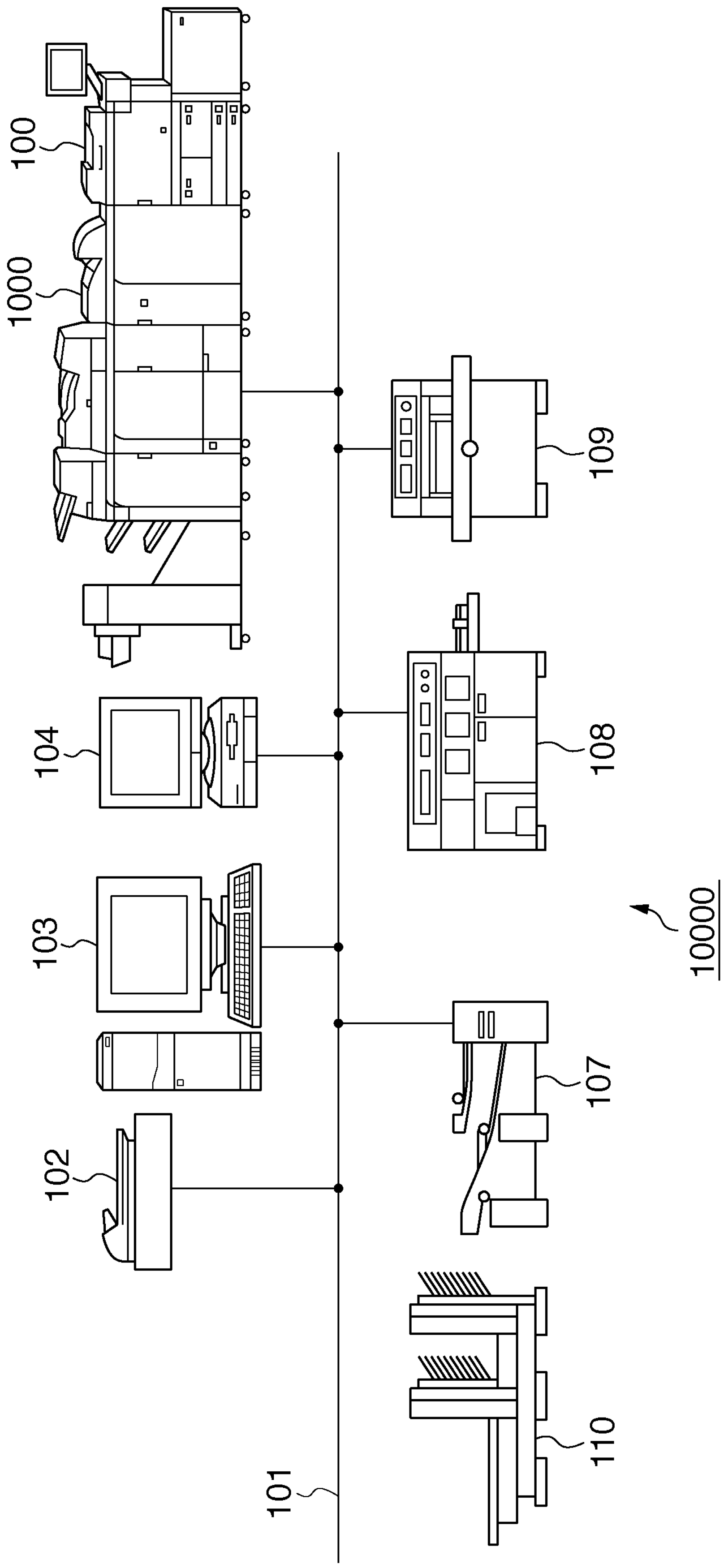
FIG. 1 is a diagram illustrating a composition of a printing and bookbinding system according to an exemplary embodiment of the present invention.

FIG. 1 is a diagram illustrating a composition of a printing-bookbinding system (POD system) 10000 including a bookbinding processing apparatus according to the embodiment of the present invention.

Here, a printing system 1000, scanner 102, server computer (PC) 103, and client computer (PC) 104 are connected via a network 101. Also, this POD system 10000 further has a sheet folding apparatus 107, case binding apparatus 108, trimmer 109, saddle stitching apparatus 110, etc.

The server PC 103 manages transmission of data between each device connected via the network 101. The client computer 104 is connected to the network 101, and transmits image data to a printing apparatus 100 of a printing system 1000 and the PC 103. Further, the sheet folding apparatus 107 executes folding processing for sheets printed by the printing apparatus 100. Also, the case binding apparatus 108 executes case binding processing with respect to sheets printed by the printing apparatus 100. The trimmer 109 executes trimming processing on each sheet bundle made up of a plurality of sheets printed by the printing apparatus 100. The saddle stitching apparatus 110 executes saddle stitching processing relating to sheets printed by the printing apparatus 100. Although the printing apparatus 100 has a function of a bookbinding processing apparatus in this embodiment, the present invention is not limited to this, and the server computer 103, client computer 104, or other post-processing apparatus may execute this function.

When the sheet folding apparatus 107, case binding apparatus 108, trimmer 109, or saddle stitching apparatus 110 is used, the user takes sheets printed by the printing apparatus 100 from the printing system 1000 and sets them in the apparatus to be used, and sheet processing is executed by that apparatus. Further, the plurality of apparatuses in the POD system 10000 are connected by the network 101, and are able to transmit data to each other, with the exception of the saddle stitching apparatus 110.

Moreover, the folding apparatus 107, case binding apparatus 108, trimmer 109, and saddle stitching apparatus 110 execute post-processing on sheets provided by a printing apparatus other than the printing apparatus 100 in the same manner.

Figure 2:
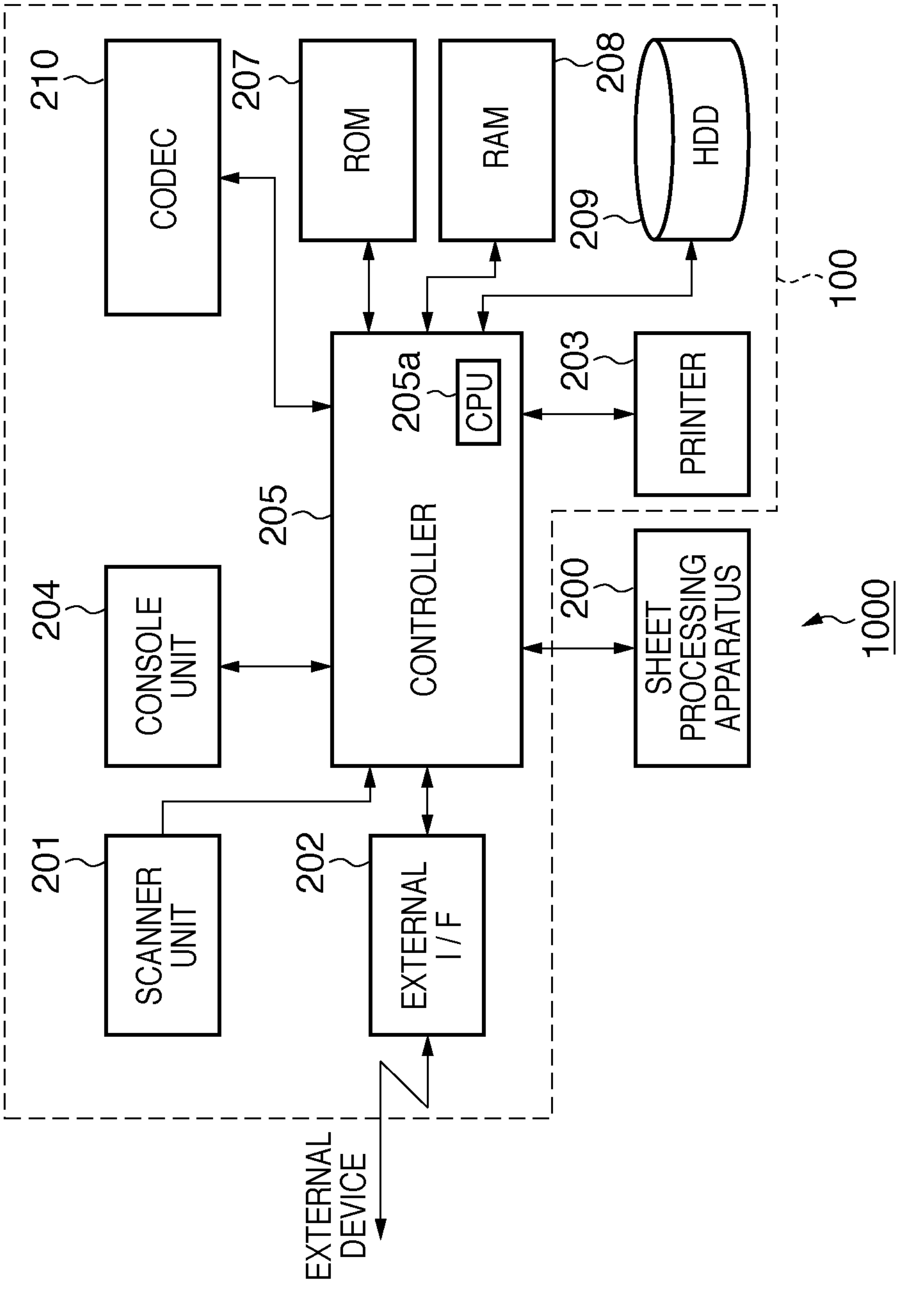
FIG. 2 is a block diagram explaining a composition of a printing system according to an exemplary embodiment of the present invention.

FIG. 2 is a block diagram explaining a composition of a printing system 10000 according to an embodiment of the present invention.

This printing system 10000 has the printing apparatus 100 and a sheet processing apparatus 200. Moreover, in the embodiment of the present invention, an MFP (multi-function peripheral) that has a plurality of functions such as a copy function and a printing function is used as an example of the printing apparatus 100. However, this printing apparatus 100 may also be a single-function printing apparatus (printer) that has only a copy function or only a printing function. Moreover, here, each unit included in the printing system 1000 is included in the printing apparatus 100, with the exception of the sheet processing apparatus 200. Further, an arbitrary number of sheet processing apparatuses 200 can be connected to the printing apparatus 100.

The printing system 10000 is composed such that the sheet processing apparatus 200 connected to the printing apparatus 100 can execute sheet processing on sheets printed by the printing apparatus 100. However, the printing system 1000 can also be composed only of a printing apparatus 100 that is not connected to the sheet processing apparatus 200.

The sheet processing apparatus 200 is composed such that it can communicate with the printing apparatus 100, and is able to receive commands from the printing apparatus 100 and execute sheet processing described later. A scanner unit 201 reads an image from an original manuscript, converts the image to image data, and forwards the image data to other units. An external I/F 202 executes data transmission between other apparatuses connected to the network 101. A printer 203 prints an image on a sheet based on input image data. A console unit 204 has a hard key input unit (key input unit) 402 described later, and a touch panel unit 401 (FIG. 4), and receives commands from a user through these. Further, the console unit 204 executes all displays of a touch panel on the console unit 204.

A controller 205 has a CPU 205*a*, and controls overall processing and operations of each unit in the printing system 1000. That is, the controller 205 also controls operations of the printing apparatus 100 and the sheet processing apparatus

200 connected to the printing apparatus 100. A ROM 207 stores all computer programs executed by the CPU 205*a* of the controller 205. For example, the ROM 207 stores programs for executing all processing in the controller 205 of the flowchart (FIGS. 6A and 6B, FIG. 7) to be described later, as well as display programs necessary for displaying all setting displays, to be described later. Further, the ROM 207 stores programs for executing operations to develop raster data obtained when the controller 205 interprets PDL (page description language) coded data received from the PC 103, PC 104, etc. In addition, the ROM 207 stores boot-sequence and font information, etc. A RAM 208 stores image data transmitted from the scanner unit 201 or the external I/F 202, or all programs and setting information loaded from the ROM 207. Further, writing data to the RAM 208 and reading data from the RAM 208 are executed under the control of the CPU 205*a*.

An HDD (hard disk drive) 209 is comprised of a hard disk and a drive unit that executes data writing/reading to/from the hard disk, etc. The HDD 209 is a high-capacity storage device that stores image data received from a scanner 201 or the external I/F 202 and compressed by a codec 210. Further, this HDD 209 also stores default values (recommended setting values) for each item, which will be discussed later. The controller 205 can output and print image data stored in the HDD 209 to the printer 203 based on instructions from a user. Further, the controller 205 can also send image data stored in the HDD 209 to the PC 103, etc., through the external I/F 202 based on instructions from a user. The codec 210 executes compression/expansion of image data, etc., stored in the RAM 208 or the HDD 209 using any compression method such as JBIG, JPEG, etc.

Figure 3:
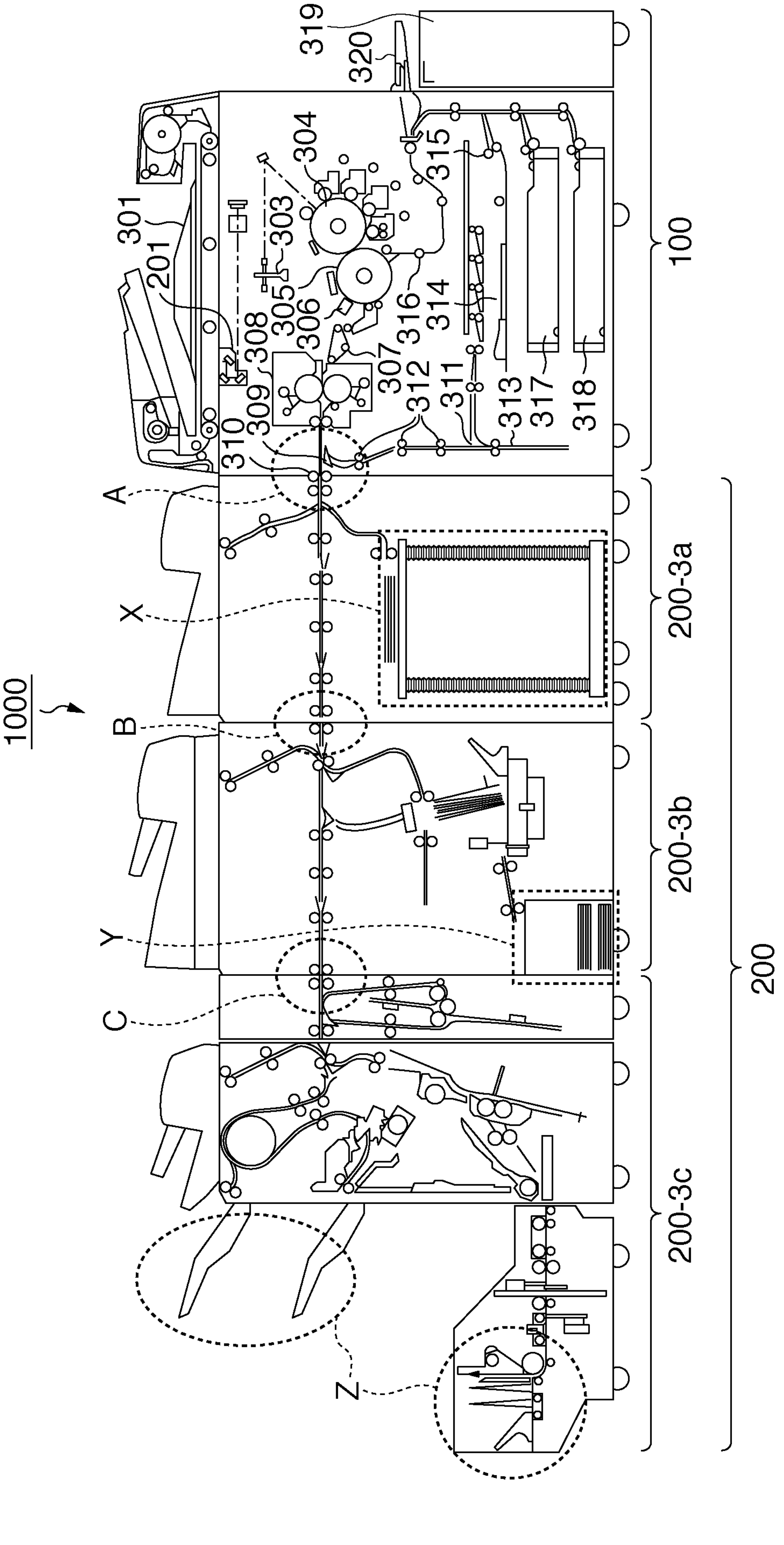
FIG. 3 is a cross-section diagram of a printing apparatus and a sheet processing apparatus connected to this printing apparatus according to an exemplary embodiment of the present invention.

FIG. 3 is a cross-section diagram of the printing apparatus 100 and the sheet processing apparatus 200 connected to this printing apparatus 100, according to the embodiment of the present invention.

An auto document feeder (ADF) 301 separates pages in order, starting with the first page of a bundle of originals set on an intake surface of an originals tray, and feeds an original on a platen glass in order to read the original by scanning it with the scanner unit 201. The scanner unit 201 reads an image of the original delivered to the platen glass, and converts the image to image data using a CCD. A rotational polygonal mirror 303 receives laser light modulated in response to the image data, and irradiates it through reflection mirrors as reflection scanning light onto a photosensitive drum 304. A latent image thus formed on the photosensitive drum 304 is developed with toner, and a toner image is transferred to a sheet attached to a transfer drum 305. A full color image is transferred to the sheet by sequentially executing this sequence of image forming processes for yellow (Y), magenta (M), cyan (C), and black (K) toners. The sheet on the transfer drum 305 to which a full color image has been transferred is separated from the transfer drum 305 by a separation pick 306, and sent to a fixing unit 308 by a pre-fixing feeding unit 307. The fixing unit 308 is comprised of an assortment of rollers and belts, is equipped with a heat source such as a halogen heater or the like, and dissolves and fixes the toner of the toner image transferred onto the sheet using heat and pressure. A sheet discharge flapper 309 is composed to be able to oscillate around an oscillation axis, and regulates the sheet feeding direction. When the sheet discharge flapper 309 is rotating in the clockwise direction in the figure, the sheet is delivered straight forward, and is discharged to the outside of the apparatus by a discharge roller 310. The controller 205 controls the printing apparatus 100 to execute single-sided printing by the above sequence.

On the other hand, when forming an image on both sides of a sheet, the sheet discharge flapper 309 rotates in the counter-clockwise direction in the figure, and the sheet path is changed to a lower direction and the sheet is sent to a double-sided feed unit. The double-sided feed unit is equipped with a reversing flapper 311, reversing roller 312, a reversing guide 313, and a double-sided tray 314. The reversing flapper 311 regulates the feed direction by rotating around the rotation axis.

When processing a double-sided printing job, the controller 205 executes control such that the printer 203 prints on the first side of a sheet, then the sheet comes in contact with the reversing roller 312 and is delivered to the reversing guide 313. Then, the rotation of the reversing roller 312 is temporarily stopped with the end of the sheet being clamped in the reversing roller 312, the reversing flapper 311 is continuously rotated in the clockwise direction in the figure, and the reversing roller 312 is rotated in the opposite direction. In this way, the sheet controlled to be switched back and delivered to a double-sided tray with the sheet's front end and rear ends switched. The sheet is temporarily loaded onto the double-sided tray 314, and then is once again delivered to a registration roller 316 by a re-supply sheet roller 315. At this time the sheet is delivered with the opposite side to the first side that underwent transfer processing facing the photosensitive drum 304. Then, a second side image is transferred to the second side of the sheet by the same process already mentioned. Then, images are formed on both sides of the sheet, and after the fixing process the sheet is discharged to the outside of the printing apparatus 100 by the discharge roller 310. The controller 205 controls the printing apparatus 100 to execute double-sided printing by the above sequence.

Further, the printing apparatus 100 has a sheet feed unit that provides sheets necessary for printing processing. The sheet feed unit has sheet feed cassettes 317, 318 (each one has, for example, a 500 sheet capacity), a sheet feed deck 319 (with, for example, a 5000 sheet capacity), a manual feed tray 320, etc. Sheets of varying sizes and materials can be separated and set on each of the sheet feed cassettes 317, 318 and sheet feed deck 319. Further, various types of sheets including special sheets such as OHP, etc., can be set on the manual feed tray 320. Each of the sheet feed cassettes 317, 318, sheet feed deck 319, and manual feed tray 320 has a feed roller, and sheets can continuously be delivered one-at-a-time by this feed roller.

Next, the sheet processing apparatus 200 shown in FIG. 3 will be described.

If the sheet processing apparatus 200 of the printing system 1000 according to the embodiment of the present invention can deliver a sheet along a sheet delivery route from an upstream apparatus to a downstream apparatus, then any number of apparatuses of any type can be connected. For example, as shown in FIG. 3, in order of closest proximity to the printing apparatus 100, a large-volume stacker 200-3*a*, a glue binding apparatus 200-3*b* and a saddle-stitching apparatus 200-3*c* can be connected in sequence, and each can be selectively used in the printing system 1000. Further, each sheet processing apparatus 200 has a sheet discharge unit, and a user can take sheet-processed sheets from any of the sheet processing apparatuses.

The controller 205 receives a print request along with an execution request for a desired sheet processing type from sheet processing type candidates executable by the sheet processing apparatus 200 connected to the printing apparatus 100 by contacting the console unit 204. Then, according to the print request of a job received from a user through the console unit 204, the controller 205 causes the printer 203 to execute print processing necessary for the job. Then, the controller 205 feeds print processed sheets of the job through a sheet feeding path, to a processing apparatus capable of executing the user-requested sheet processing, and causes the sheet processing apparatus to execute the sheet processing.

For example, when the printing system 1000 has the system composition shown in FIG. 3, the job that has received a print request from a user is a job for which the large-volume stacker 200-3*a* is commanded to stack a large volume of sheets. This job is called a "stacker job".

In this stacker job, when processing with the printing system shown in FIG. 3, the controller 205 feeds sheets printed by the printing apparatus 100 through point A in FIG. 3 into the large-volume stacker 200-3*a*. After that, the controller 205 causes the large-volume stacker 200-3*a* to execute the stacker job. The controller 205 then holds the sheets in the large-volume stacker 200-3*a* at a discharge portion X inside the large-volume stacker 200-3*a* without delivering them to another device (for example, a device in a subsequent stage).

The user can directly take these printed sheets held at the discharge portion X in FIG. 3 from the discharge portion X. By this, it is not necessary to feed the printed sheets, in the sheet delivery direction of FIG. 3, to a discharge point Z of the furthest downstream process, in order to take the printed sheets of the stacker job.

Further, regarding FIG. 3, a job that has received a print request from the user is a job commanded to execute sheet processing by the glue binding apparatus 200-3*b* (for example, a glue binding process of either a bookbinding process or a pad binding process). This job is called a "glue binding job". In this glue binding job, when processed by the system 1000 shown in FIG. 3, the controller 205 delivers sheets printed by the printing apparatus 100 to the inside of the glue binding apparatus 200-3*b* through points A and B in FIG. 3. After that, the controller 205 causes the glue binding apparatus 200-3*b* to execute glue binding processing of the job. Then, the controller 205 causes the glue binding apparatus 200-3*b* to hold the printed material processed by the glue binding apparatus 200-3*b* in a discharge portion Y inside the glue binding apparatus 300-3*b* without delivering it to another device (for example, a device in a subsequent stage).

As a further example, with the system composition shown in FIG. 3, a job that has received a print request from the user is a job commanded to execute sheet processing by the saddle-stitching apparatus 200-3*c*. This sheet processing by the saddle-stitching apparatus 200-3*c* has, for example, saddle-stitching, punching processing, trimming processing, shift sheet discharge processing, folding processing, etc. Here, this job is called a "saddle-stitching job".

In this saddle-stitching job, when processing with the printing system 1000 shown in FIG. 3, the controller 205 delivers sheets printed by the printing apparatus 100 to the saddle-stitching apparatus 200-3*c* through the points A, B and C. After that, the controller 205 causes the saddle-stitching apparatus 200-3*c* to execute sheet processing of the job. Then, the controller 205 causes the printed materials of the saddle-stitching job sheet processed by the saddle-stitching apparatus 200-3*c* to be discharged in a discharge portion Z in the saddle-stitching apparatus 200-*c*.

Moreover, there is a plurality of discharge portion candidates for the discharge portion Z. These can be used when separating discharge portions for each sheet processing, as the saddle-stitch apparatus 200-3*c* can execute a plurality of types of sheet processing.

As explained above, the printing system 1000 of the present embodiment can connect a plurality of sheet processing apparatuses to the printing apparatus 100. Also, this plurality of sheet processing apparatuses can be connected to the printing apparatus 100 in any arbitrary assortment. Further, the connection sequence of this plurality of sheet processing apparatuses can be changed freely as long as the sheet delivery path between the apparatuses is connected. Further, there exists a plurality of types of sheet processing apparatuses that can be connected to the printing apparatus 100.

Figure 4:
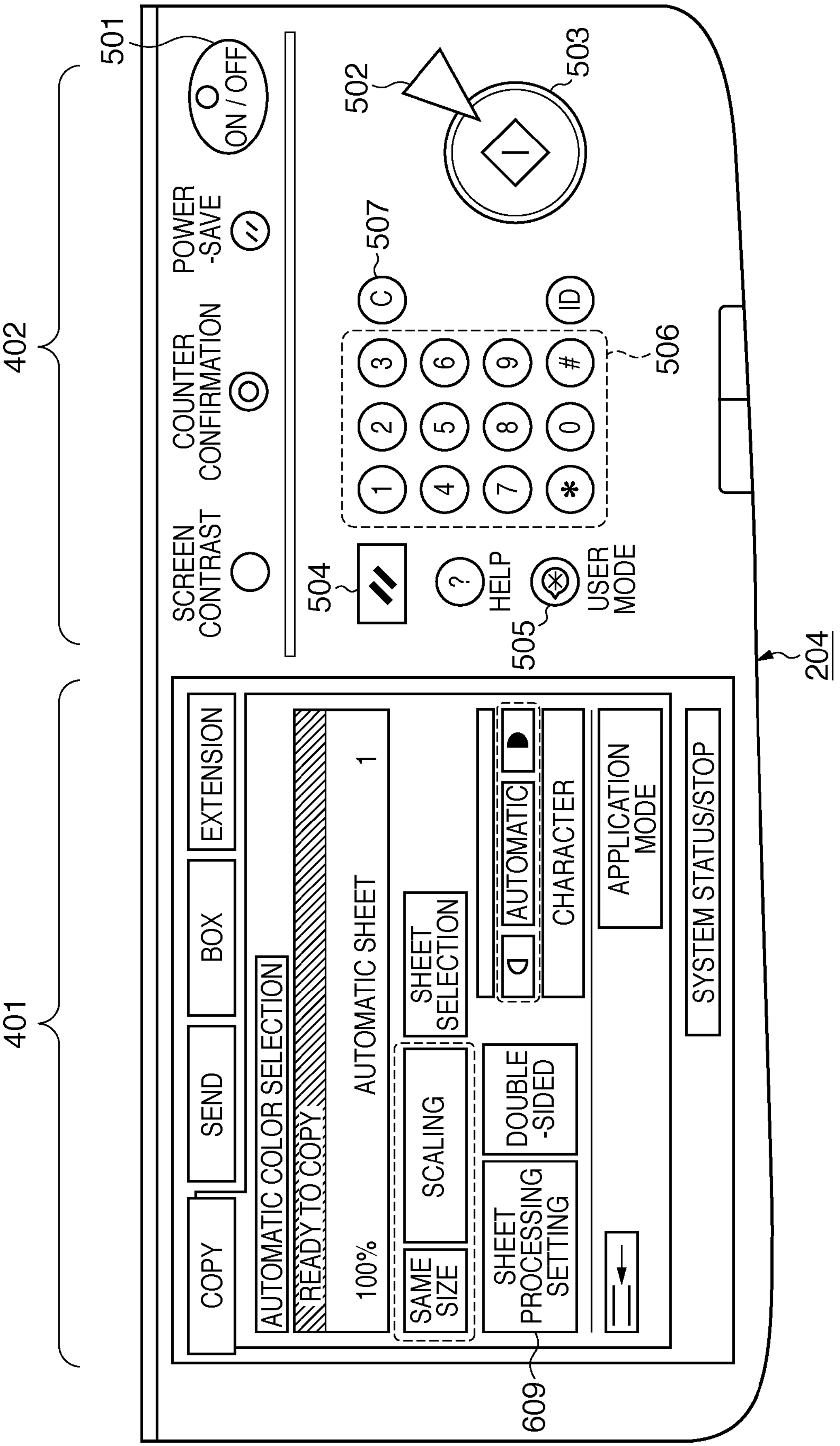
FIG. 4 depicts an external view of a console unit of the printing apparatus according to the present embodiment.

FIG. 4 depicts an external view of the console unit 204 of the printing apparatus 100 according to the present embodiment.

This console unit 204 is equipped with the touch panel unit 401 and the key input unit 402. The touch panel unit 401 is equipped with a liquid crystal display and transparent electrodes adhered on top of the liquid crystal display, and displays each type of setting screen for receiving commands from a user. This touch panel unit 401 has both a function of displaying each screen and an input function of receiving commands from the user. The key input unit 402 is equipped with a power key 501, start key 503, stop key 502, guide key 504, user mode key 505, and a numeric keypad 506. The start key 503 is used to make the printing apparatus 100 start execution of a copy job or transmission job. The numeric keypad 506 is used to execute setting for numeric value inputs such as number of printed copies, etc. The guide key 504 is used when calling setting information stored in the memory when, for example, executing each setting for bookbinding, as will be described later.

The controller 205 controls the printing system 1000 to execute each processing based on commands received from the user through each type of screen displayed on the touch panel unit 401 or commands received from the user through the key input unit 402.

The touch panel unit 401 displays mode buttons for setting modes for each type of operation such as copy, send, box, extension, etc., and each type of command button for setting scaling for printing, sheet type, etc. Since these types of command buttons are well-known, an explanation thereof will be omitted, and a case in which a sheet processing setting button 609 is pressed will be explained.

Figure 5:
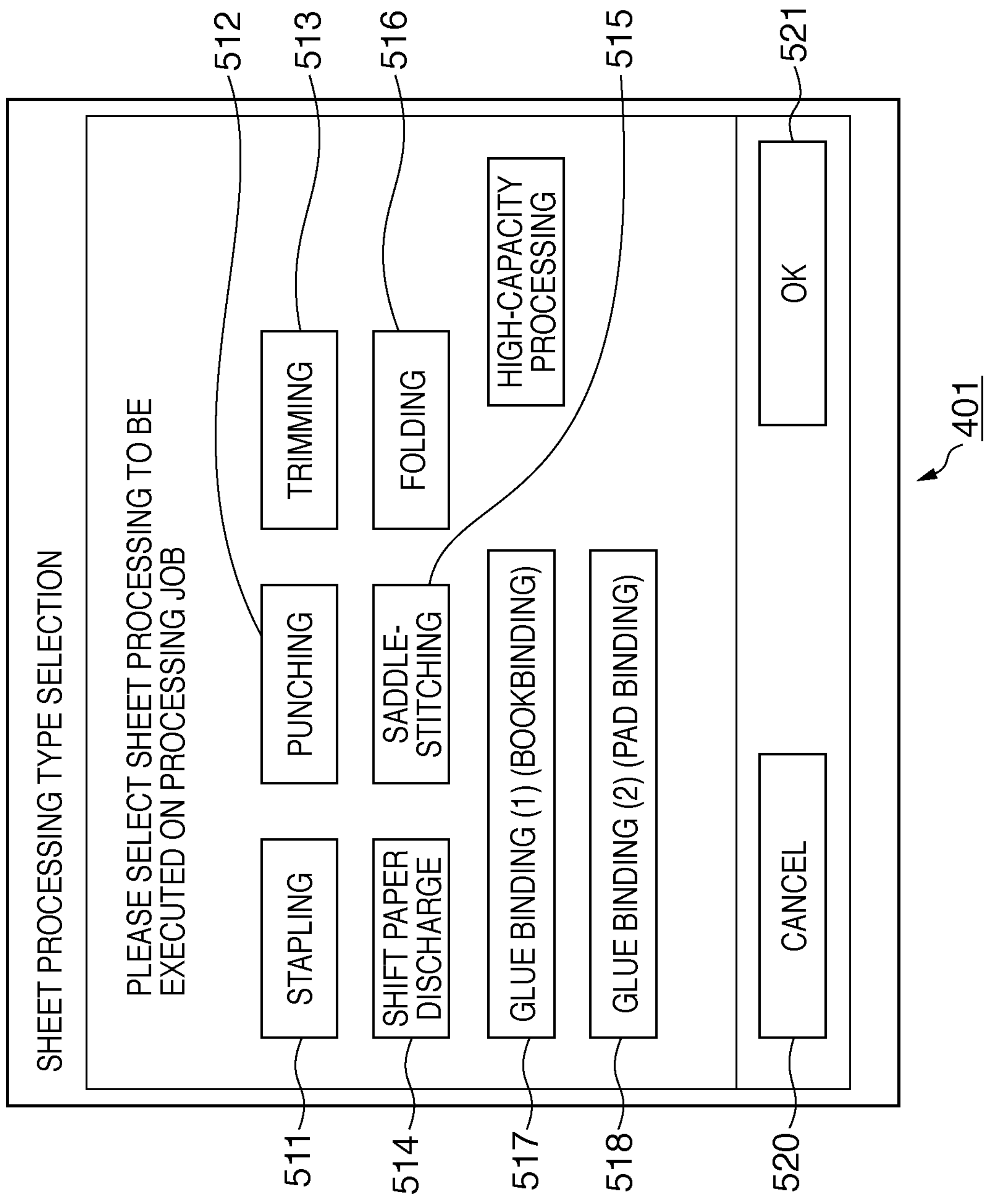
FIG. 5 is a diagram illustrating an example screen displayed on a touch panel unit of the console unit of the printing apparatus when a sheet processing setting button displayed in FIG. 4 is depressed.

FIG. 5 is a diagram illustrating an example screen displayed on the touch panel unit 401 of the console unit 204 of the printing apparatus 100 when the sheet processing button 609 is pressed.

By using this screen, a user can select types of sheet processing executable by using sheet processing apparatuses 200 included in this printing system 1000.

Reference numeral 511 denotes a button to indicate stapling processing, reference numeral 512 denotes a button to indicate execution of punching, and reference numeral 513 denotes a button to indicate trimming processing. Reference numeral 514 denotes a button to indicate shift sheet discharge, reference numeral 515 denotes a button to indicate saddle-stitching, and reference 516 denotes a button to indicate folding. Reference numeral 517 denotes a button to indicate glue binding (bookbinding), and reference numeral 518 denotes a button to indicate glue binding (pad binding). A cancel button 520 is a button to cancel all of these settings, and an OK button 521 is a button to enable these settings.

Figure 6A:
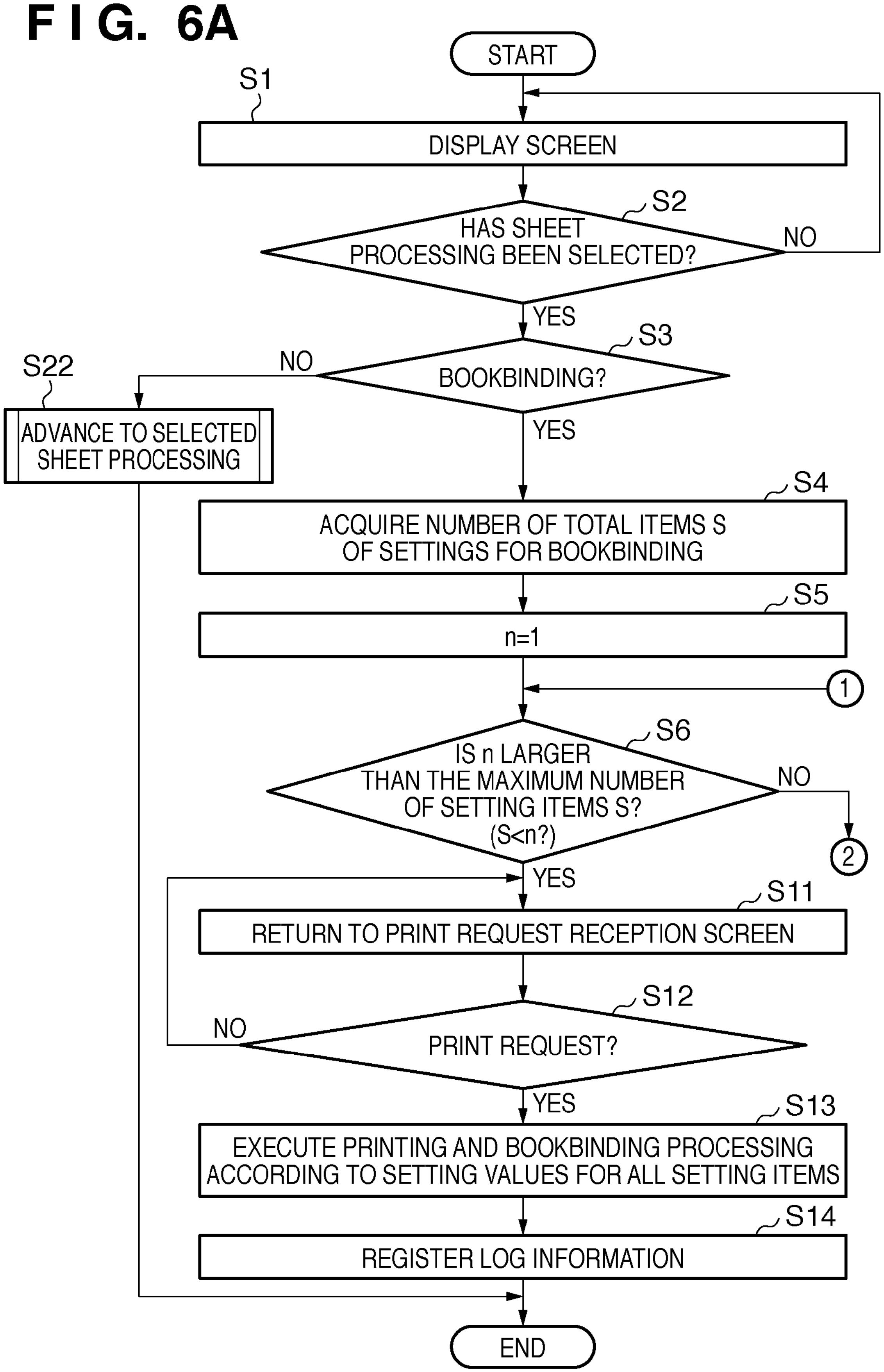
FIGS. 6A and 6B are flowcharts explaining processing for the printing apparatus according to an exemplary embodiment of the present invention.
Figure 6B:
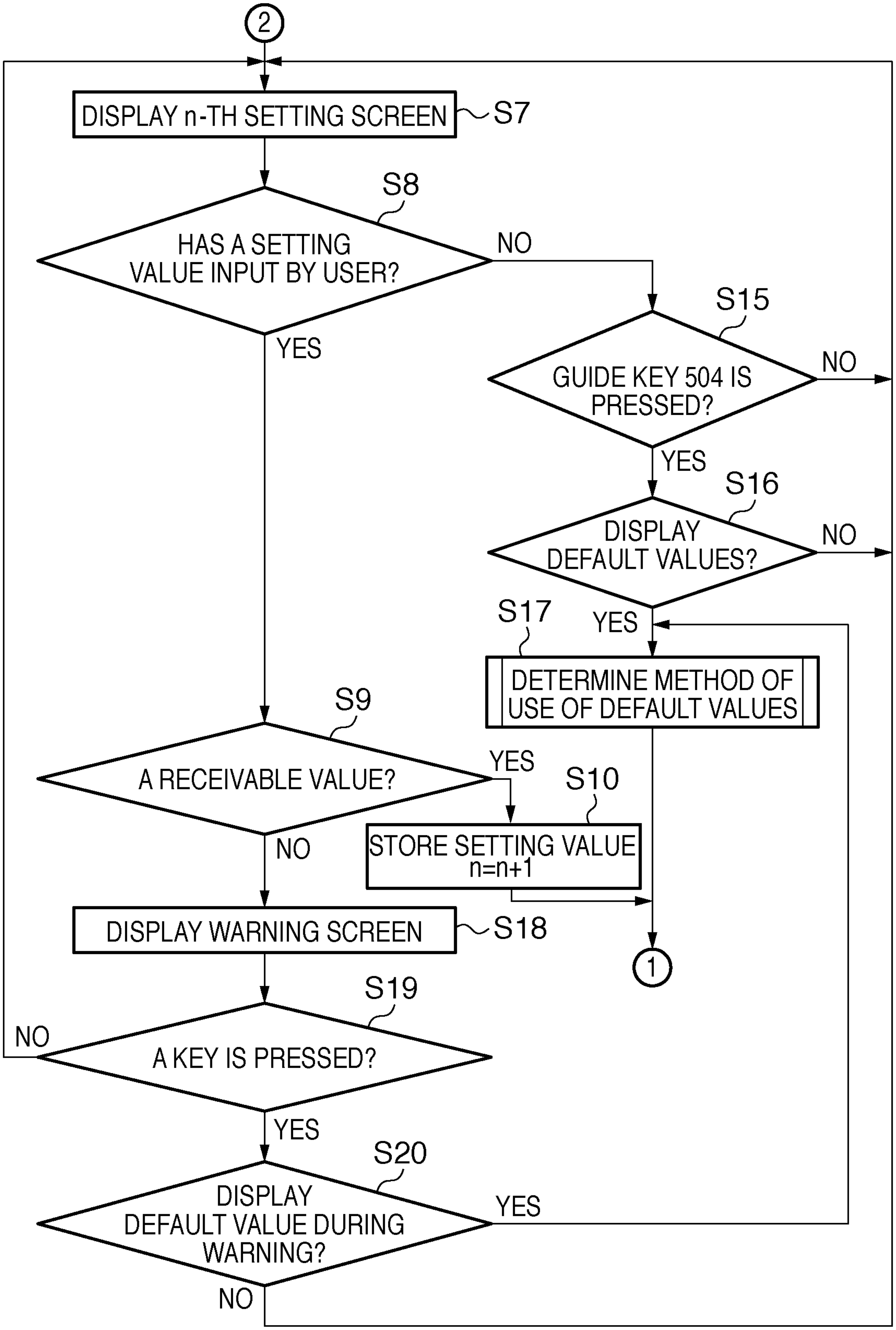

FIGS. 6A and 6B are flowcharts explaining processing for the printing apparatus 100 according to the embodiment of the present invention, and the program to execute this processing is stored in the ROM 207, and is executed under the control of the controller 205 of a CPU 205*a*.

This processing is started when a user presses the sheet processing setting button 609 of the console unit 204, and first, in step S1, a screen (FIG. 5) for selecting a type of sheet processing is displayed on the touch panel unit 401 of the console unit 204. Next, in step S2, selection of a sheet processing is awaited, and when a sheet processing is selected the process advances to step S3. In step S3, it is determined whether or not bookbinding as been selected. If bookbinding has been selected in step S3, the process advances to step S4, while if it is determined that bookbinding has not been selected, the process advances to step S22, processing corresponding to the selected sheet processing is executed (an explanation thereof is omitted here), then the process advances to step S14, and log information is recorded.

When bookbinding has been selected in step S3, the process advances to step S4, and the number of general setting items S to be set when bookbinding is executed is acquired. Next, the process advances to step S5, and a variable n for counting those setting items numbers is set to "1" (the first item). The variable n is set in the RAM 208. Next, the process advances to step S6, the value of the variable n and the number of general setting items S acquired in step S4 are compared, and it is determined whether or not n is larger than S. Here, when n is determined to be larger than S, setting of all of the number of general setting items S is complete, and the process advances to step S11. On the other hand, if S≥n, setting of all of the number of general setting items S is not complete, and the process advances to step S7.

In step S7, the setting screen of the n-th item for receiving the setting value for the n-th item of the bookbinding function is displayed.

Figure 8:
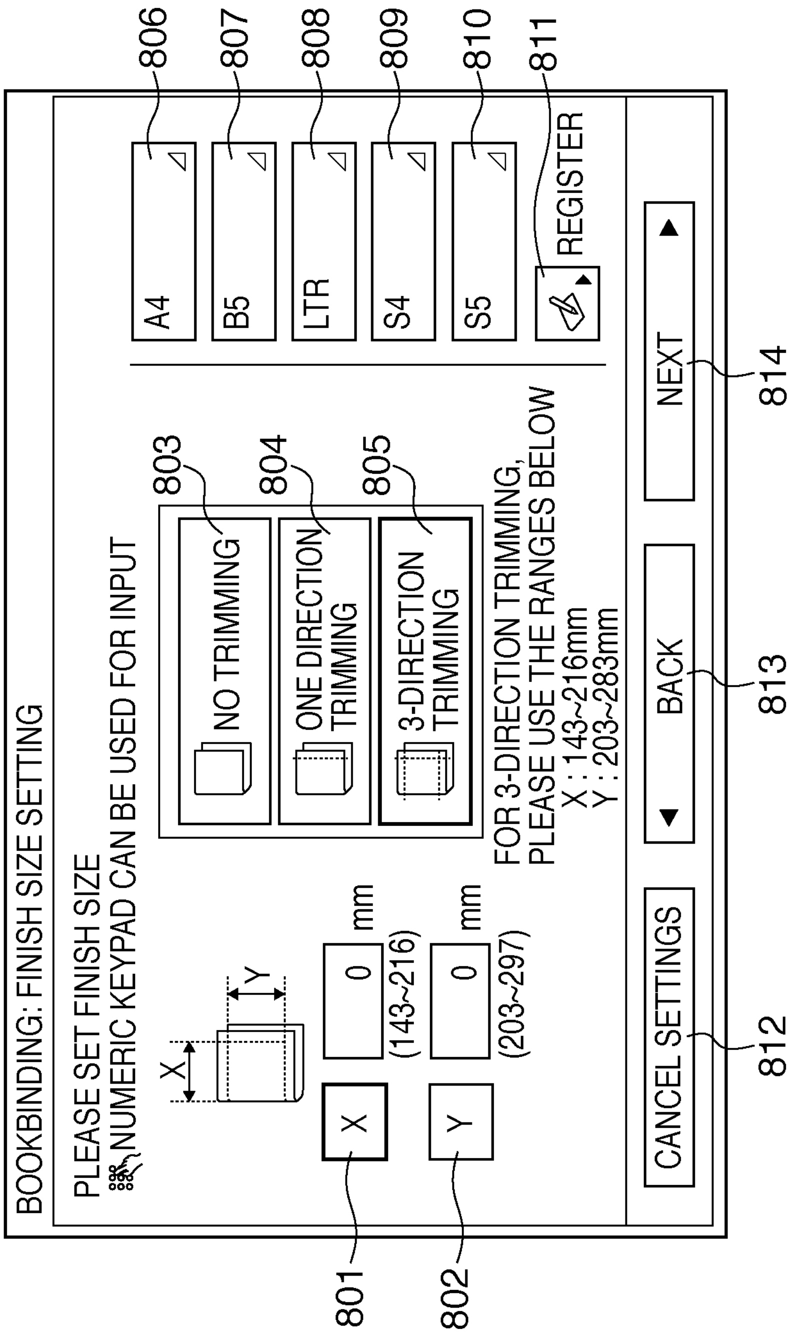
FIG. 8 is a diagram illustrating an example of a screen for setting a finish size for case binding according to an exemplary embodiment of the present invention.
Figure 9:
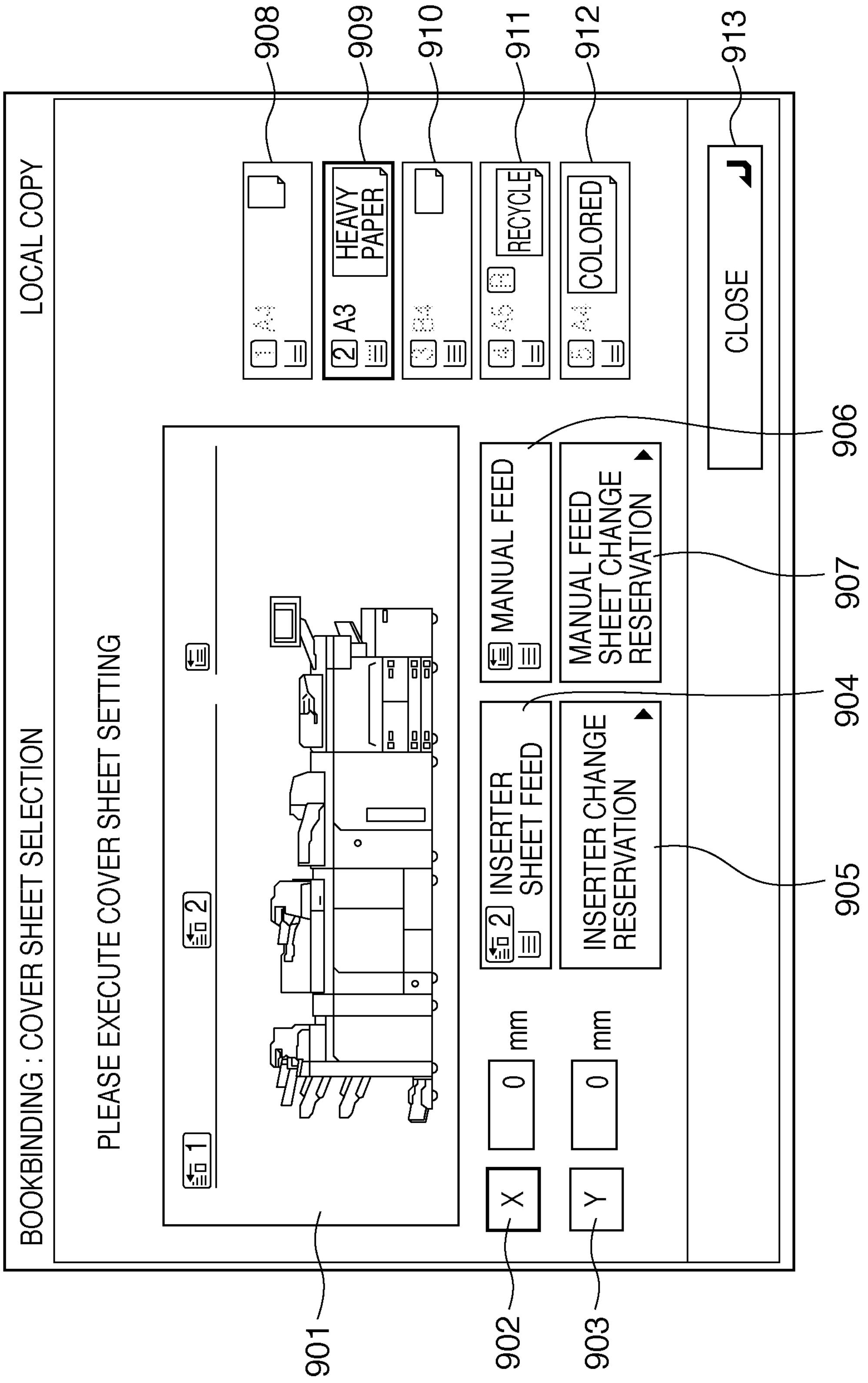
FIG. 9 is a diagram illustrating an example of a setting screen for a cover size for case binding according to an exemplary embodiment of the present invention.
Figure 10:
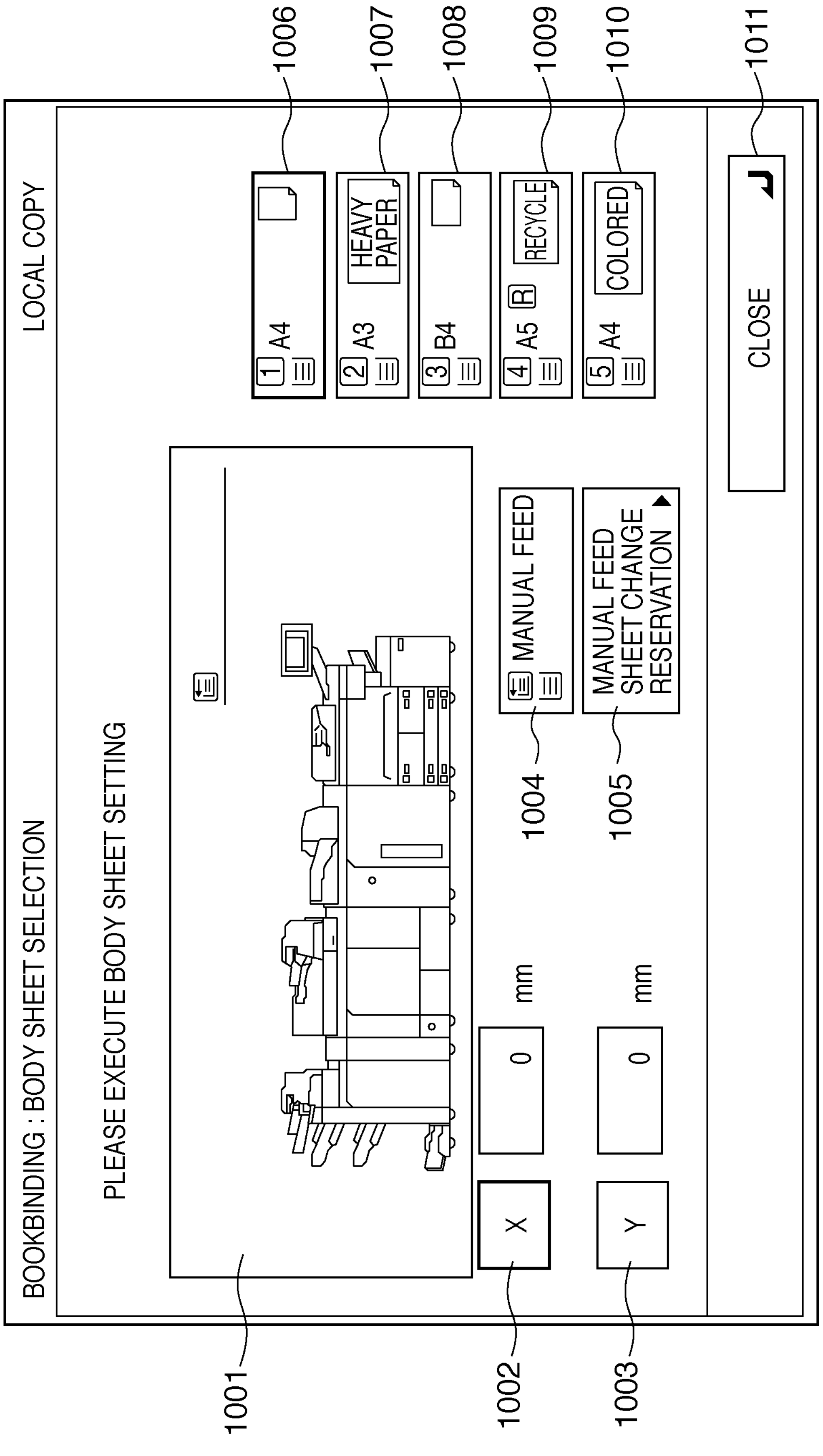
FIG. 10 is a diagram illustrating an example of a setting screen for a sheet size of the body for case binding according to an exemplary embodiment of the present invention.

An example of this setting screen is displayed in FIGS. 8 to 10, to be described later. Moreover, FIG. 8 is, for example, a case when the value of the variable n is "1", FIG. 9 is a case when the value of n is "2", and FIG. 10 is a case when the value of n is "3".

Next, the process advances to step S8, and it is determined whether or not the setting value for that item is received from the user. If it is determined in step S8 that the user inputs a setting value, the process advances to step S9, but if it is determined that the user does not input a setting value, the process advance to step S15. In step S9, it is determined whether or not the setting value input in step S8 is a receivable setting value. Here, if the setting value is determined to be receivable, the process advances to step S10, the setting value is input and stored as the setting value for the appropriate item. Then, the value of the variable n is incremented by 1 and the process advances to step S6. On the other hand, in step S9, if the setting value is determined not to be receivable, the process advances to step S18.

If the setting value is not input, the process advances from step S8 to step S15, and it is determined whether or not the guide key 504 (FIG. 4) of the console unit 204 has been depressed. If it is determined in step S15 that the guide key 504 has been depressed, the process advances to step S16, and when it is determined that the guide key 504 has not been depressed, the process returns to step S7. In step S16, it is determined whether or not preset values (default values) for bookbinding have been registered and can be displayed. Here, if it is determined in step S16 that they can be displayed, the process advances to step S17, the method of use for those preset values is determined based on user instructions, and the process returns to step S7. Moreover, details of the processing of this step S17 will be described later with reference to FIG. 7. On the other hand, in step S16, if it is determined that the default values are not displayed, the process returns to step S7.

Further, in step S9, if it is determined that the user-instructed value is not receivable, the process advances to step S18, and a warning display screen that warns the user is displayed on the touch panel unit 401.

Figure 15A:
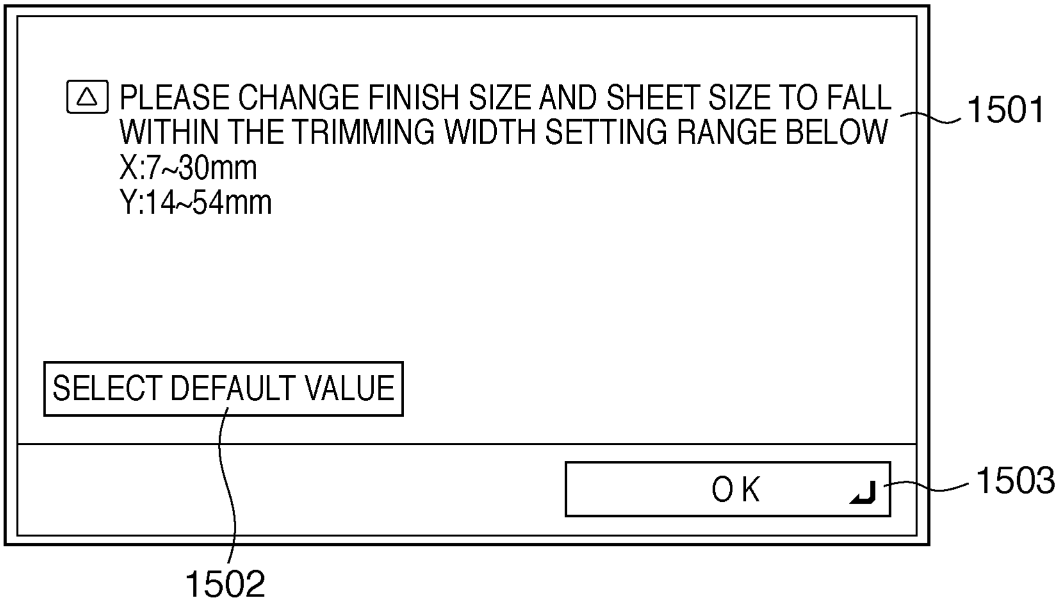
FIGS. 15A and 15B are diagrams for illustrating examples of a warning display when an incorrect setting value is input during sheet processing setting.
Figure 15B:
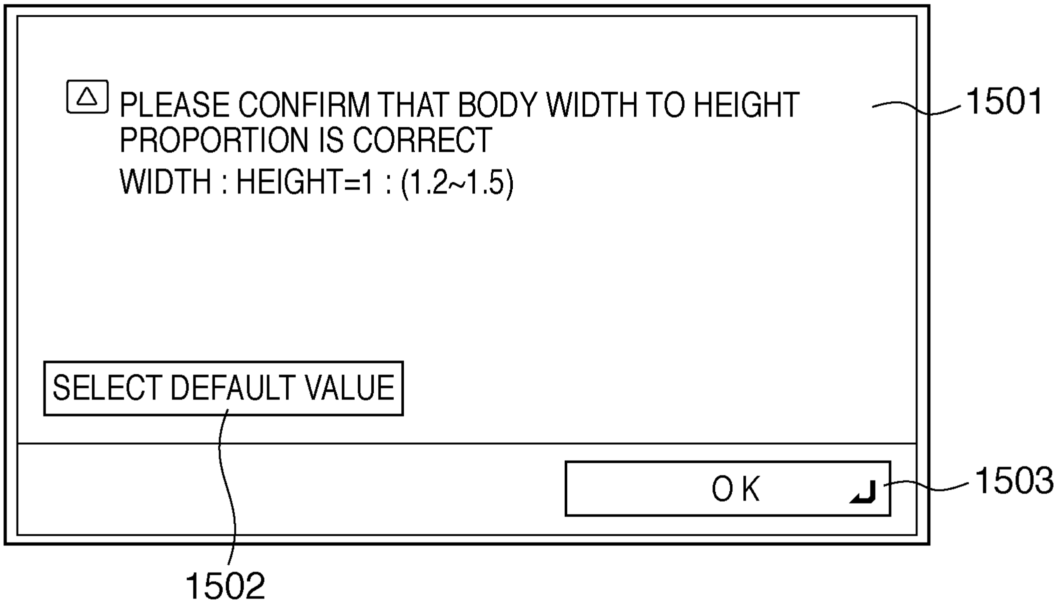

FIGS. 15A and 15B are diagrams illustrating examples of warning screens displayed on the touch panel unit 401 of the console unit 204 in step S18, when an input error of a setting value occurs during sheet processing setting. Moreover, these warning screens are displayed when a setting value input by an operator is incorrect.

The warning message shown in FIG. 15A is displayed when a sheet size value input by a user is not a supported trimming width. The user is notified to confirm the finish size and sheet size and reset the indicated trimming size.

FIG. 15B is displayed when a body sheet size length and width proportion input by a user is not regulated. Next, the user is prompted to reset a correct height and width proportion for the setting value.

A warning message 1501 displays reasons for each warning message display. A "choose default value" button 1502 is used to move to a default value display screen such as those shown in FIGS. 11 through 13 in accordance with a selected item when the warning message is called out. When an "OK" key 1503 is indicated, the process returns to an original setting screen (FIGS. 8 to 10) where the warning error occurred.

Next, the process advances to step S19, and it is determined whether or not the default value selection button 1502 of the warning screen is indicated (touched). If it is determined in step S19 that the default value selection button 1502 is designated, the process advances to step S20. If it is determined in step S19 that the default value selection button 1502 is not designated, the process advances to step S7, the warning screen display is closed, and the original setting screen is displayed. In step S20, if the setting value for bookbinding is not receivable, it is determined whether or not the default value is set to be displayed. Here, if the default value is set to be displayed during the warning, the process advances to step S17 as previously described, a screen to determine the method of use for a default value is displayed and a user input is awaited. In step S20, when the default value is not set to be displayed, the process returns to step S7.

Figure 14:
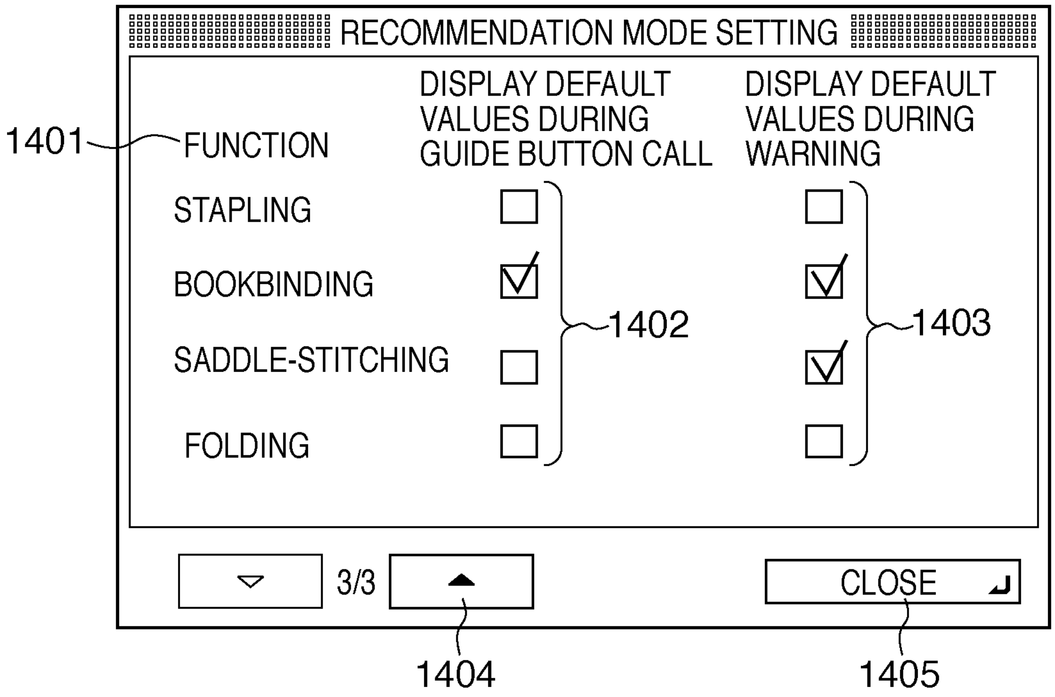
FIG. 14 is a diagram illustrating an example of an operation screen for setting whether or not default values are displayed for functions of each sheet process.

FIG. 14 is a diagram illustrating an example of a console screen for setting whether to display a default value for each sheet processing function. Moreover, this setting is, for example, preset through step S3 of FIG. 6A, and the setting contents is referred in step S16 and step S20 of FIG. 6B described above.

Figure 11:
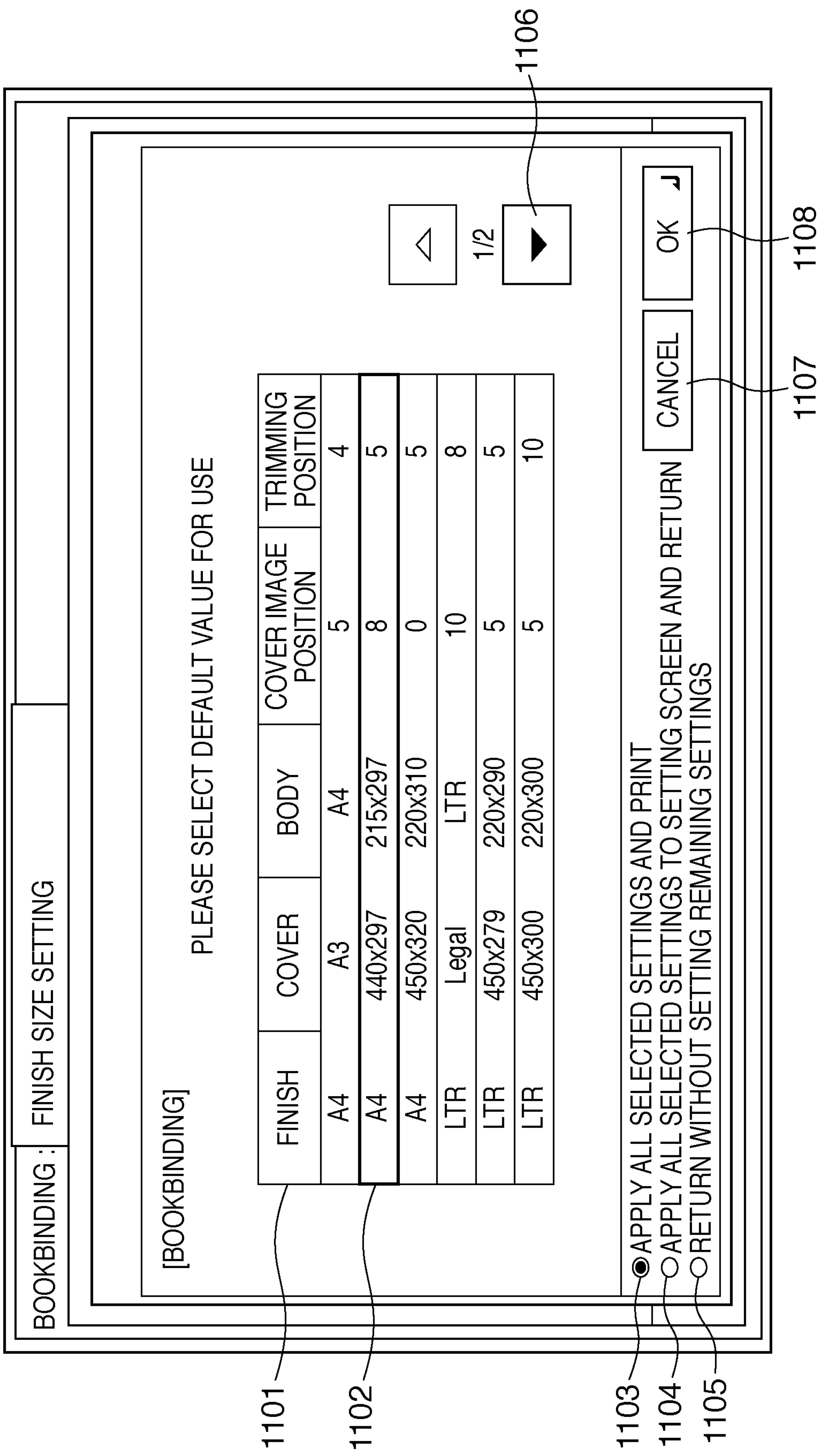
FIG. 11 is a diagram illustrating an example of a display screen for default values when making settings for the final output according to an exemplary embodiment of the present invention.
Figure 12:
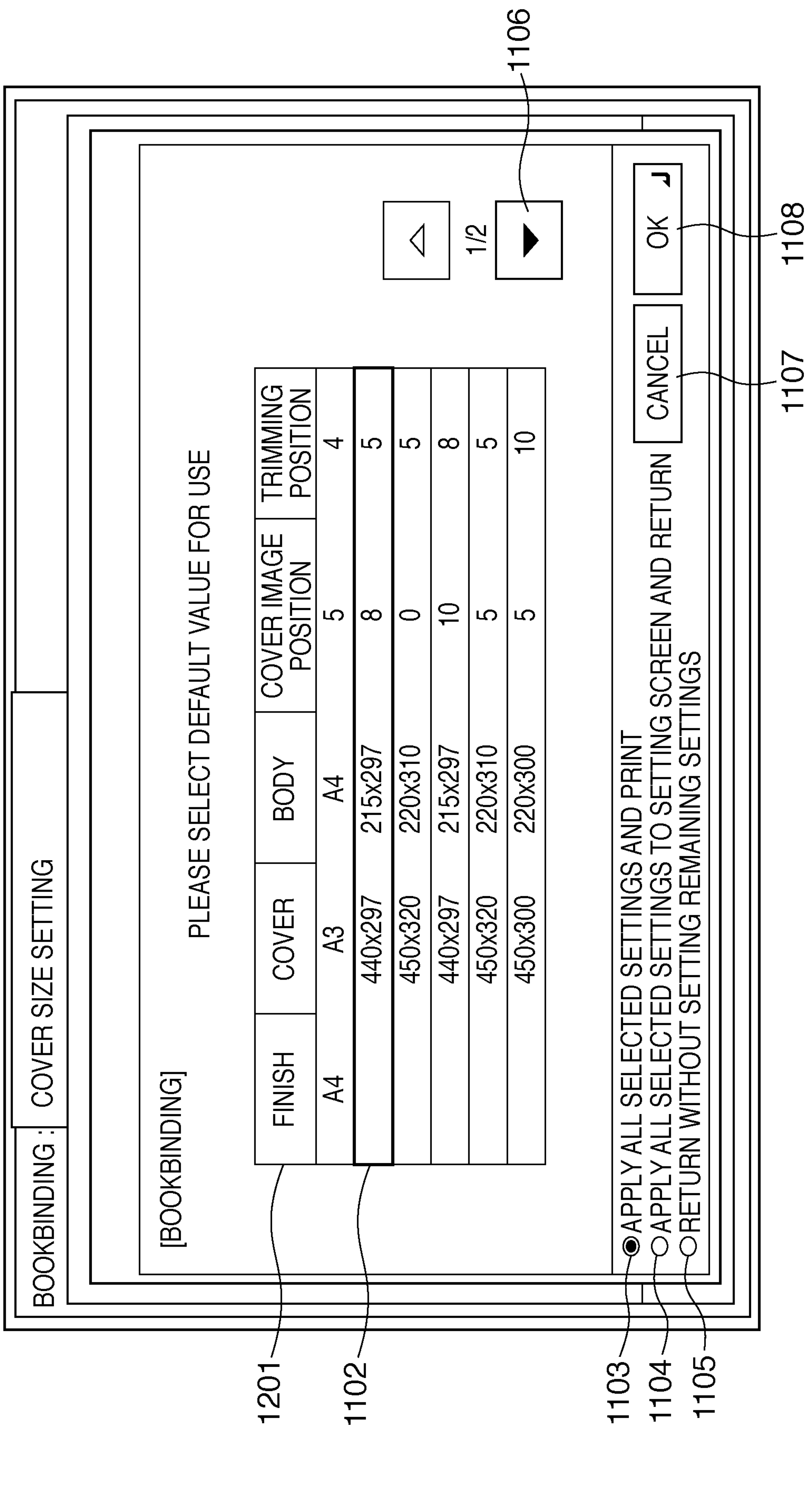
FIG. 12 is a diagram illustrating an example of a display screen for default values when making settings for the sheet size of the cover for case binding according to an exemplary embodiment of the present invention.
Figure 13:
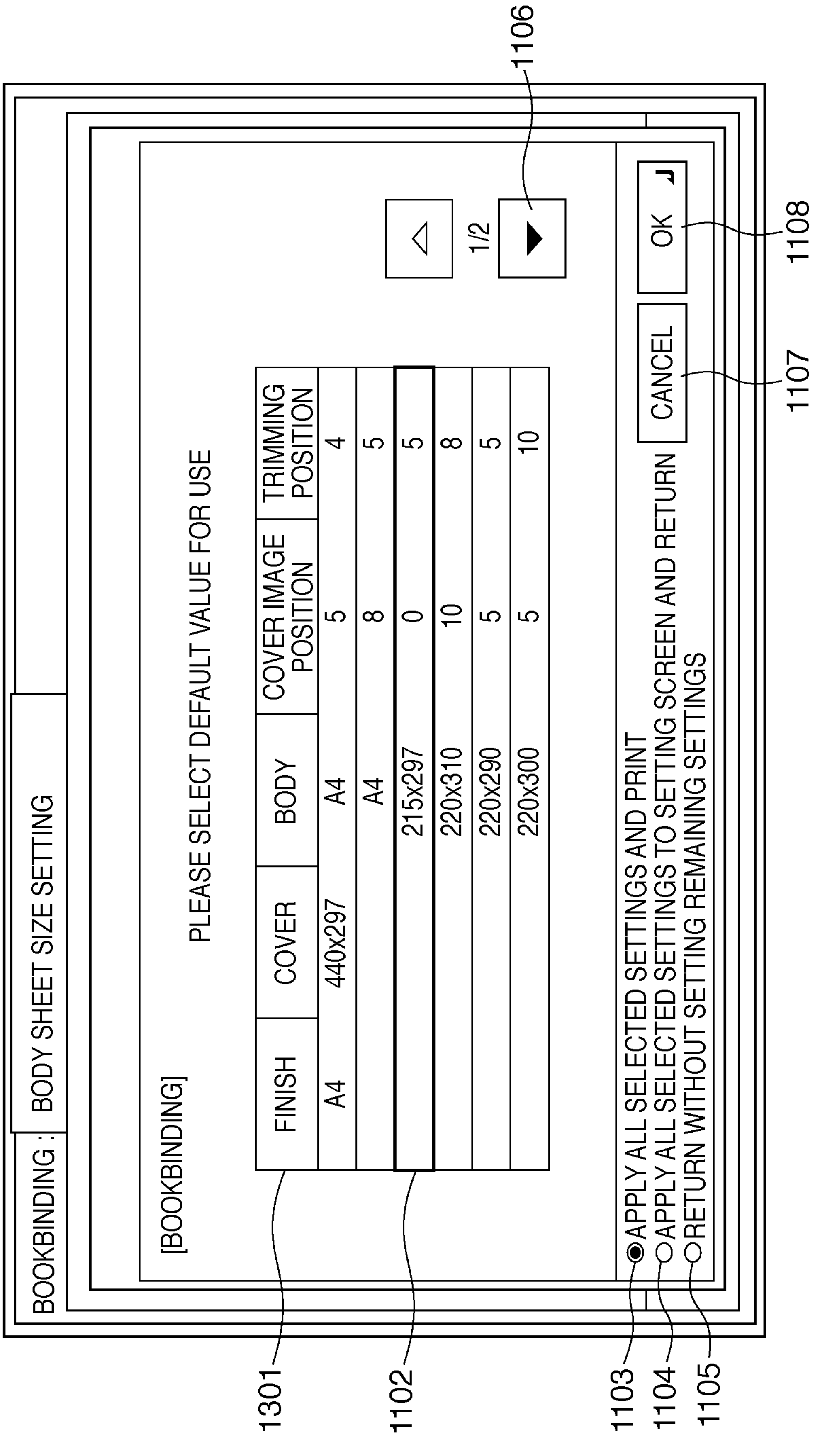
FIG. 13 is a diagram illustrating an example of a display screen for default values when making settings for the sheet size of the body for case binding according to an exemplary embodiment of the present invention.

In FIG. 14, a function 1401 displays a sheet processing function that stores a default value. When a check is inserted into any of check buttons 1402 corresponding to that function, a UI screen that displays a default value such as those shown in FIGS. 11 to 13 is displayed when the user pushes the guide key 504 of the console unit 204 when setting a sheet processing function. On the other hand, for sheet processes for buttons 1402 that are not checked, a UI screen for setting using those default values is not displayed even if the guide key 504 is pressed. Further, if a check is inserted into any of check buttons 1403, that checked sheet processing function displays a setting screen with the default value from the warning message UI when a warning message is displayed due to an operator making an incorrect input during setting on the operation screen. In other words, when a warning screen such as those shown in FIG. 15A or FIG. 15B is displayed, default values can be referred to, and item setting can be set based on these by pressing the default value selection button 1502. On the other hand, when none of the buttons 1403 is checked, and when a warning message such as those shown in FIG. 15A or FIG. 15B is displayed, the default value selection button 1502 that displays a setting screen for default values is not displayed.

A scroll key 1404 scrolls and displays other sheet processing functions when the sheet processing functions cannot be displayed on a single screen. When a "close" key 1405 is indicated, a validity setting for the default value display set on this screen is registered as valid.

By this, in step S6, if the number n of set items is larger than the setting value S, the process advances to step S11, and a reception screen that receives a print request is displayed. Next, the process advances to step S12, and it is determined whether a print request has been input. If it is determined that the print request has not been input, the process returns to step S11, but if the print request has been input, then the process advances to step S13, and printing of sheets and bookbinding processing on those printed sheets are executed according to items set by the above processing. Then, the process advances to step S14, and setting values set for this bookbinding processing are registered as log information.

Next, setting items for bookbinding explained above will be explained using a specific example.

FIGS. 8 through 10 are diagrams illustrating examples of UI screens that display settable items for bookbinding for the POD system 10000 according to the embodiment of the present invention. Here, sheet size settings made up of finish size, cover sheet size, and body size are selected according to the value of a variable n explained above.

FIG. 8 is a diagram illustrating an example of a screen for setting a finishing size for bookbinding according to the embodiment of the present invention.

A "user-defined size (width (X)) setting" key 801 sets a width (X) of a bookbinding finish. A "user-defined size (height (Y))" key 802 sets a height (Y) of a bookbinding finish. These setting values are input using the numeric keypad 506 on the console unit 204. A "no trimming" key 803 is selected when trimming processing is not to be executed for bookbinding. A "unidirectional trimming" key 804 is selected when printed sheets are to be trimmed in one direction only for bookbinding. A "three-directional trimming" key 805 is selected when printed sheets are to be trimmed in three directions for bookbinding. Keys 806 through 810 are keys for setting A4, B5, LTR, S4, and S5 finish sizes, respectively. A "user-defined size registration" key 811 is a key for registering a user-defined sheet size set by a user using the user-defined size setting keys 801 and 802. A "delete settings" key 812 is a key to discard (cancel) all finish sizes selected on this screen. A "back" key 813 is a key to give the instruction to discard all finish size settings selected on this screen and return to the previous screen. A "next" key 814 is a key to enable finish size settings selected on this screen and continue to the next screen.

FIG. 9 is a diagram illustrating an example of a cover size setting screen for bookbinding according to an embodiment of the present invention.

Reference numeral 901 denotes a sheet feed source display that displays a sheet feed source that supplies cover sheets, and displays a selected sheet feed source. A "user define" key 902 is a key to set a width (X) of a cover size for bookbinding. A "user define" key 903 is a key to set a height (Y) of a cover size for bookbinding. These setting values are input using the numeric keypad 506 on the console unit 204. An "inserter sheet feed selection" key 904 sets a bookbinding cover as a sheet provided by an inserter. An "inserter change reservation" key 905 sets the next sheet size to be provided by the inserter. A "manual feed" key 906 sets a bookbinding cover as a manually fed sheet. A "manual sheet change reservation" key 907 sets the next sheet size to be manually fed. Reference numerals 908 to 912 denote display keys for setting A4, A3, B4, A5R, and A4 sheet sizes, respectively. However, A4, B4 and A5R cannot be selected as bookbinding cover sizes, and the keys 908, 910, 911, and 912 are grayed out. A "close" key 913 is a key for holding contents set on this cover size setting screen, and for closing the setting screen.

FIG. 10 is a diagram illustrating an example of a body sheet size for bookbinding according to the embodiment of the present invention.

Reference numeral 1001 denotes a sheet feed source display that displays a sheet feed source that can be used to supply body sheets, and displays a selected sheet feed source. A "user define" key 1002 sets a width (X) of a body sheet size for bookbinding. A "user define" key 1003 sets a length in the vertical direction (Y) of a body sheet size for bookbinding. These setting values are input using the numeric keypad 506 of the console unit 204. A "manual feed" key 1004 sets sheets for a body to be manually fed for bookbinding. A "manual sheet change reservation" key 1005 sets a sheet size to be manually fed next. Reference numerals 1006 through 1010 are keys to set body sheet sizes A4, A3, B4, A5R, and A4, respectively, for bookbinding. A "close" key 1011 is a key to hold setting values set using this screen, and to close the setting screen.

FIGS. 11 through 13 are diagrams illustrating examples of a list display of each default value for finish size, cover size and body sheet size for bookbinding according to the embodiment of the present invention. These screens are diagrams illustrating example screens displayed in step S17 of FIG. 6B when the guide key 504 is pressed when a finish setting screen, cover size setting screen, and body sheet size setting screen such as those shown in previously-described FIGS. 8 to 10 are displayed.

FIG. 11 is a diagram illustrating an example of a display screen for default values during finish setting according to an embodiment of the present invention. This list display of default values displays an arrangement of stored recommended values for finish size, cover size, body size, etc. in list form.

A default value list 1101 displays setting values for sheet processing setting items narrowed down to finish size when the guide key 504 has been pressed. A selection bar 1102 displays setting values selected by a user. When a button 1103 is selected and an OK key 1108 is depressed while displaying the screen as shown in FIG. 11, printing using setting values selected in the selection bar 1102 as all setting values for bookbinding can be immediately started.

On the other hand, if there is a check in a button 1104 and an "OK" key 1108 is depressed, the setting values selected in the selection bar 1102 are set as the setting values for all selection items for bookbinding, and the process advances to the next setting screen. Further, when there is a check in a button 1105 and an "OK" key 1108 is depressed, the setting value selected in the selection bar 1102 is set as the setting value for finish, and the process proceeds to the next selection setting screen. A scroll key 1106 is used to scroll a screen to display default values when there are more default values than are displayed. A "cancel" key 1107 is a key for invalidating operations on this default value screen and returning to a setting screen for finish size shown in FIG. 8.

FIG. 12 is a diagram illustrating a display screen for setting values during setting for cover sheet values for bookbinding according to the embodiment of the present invention, and previously described keys that realize the same functions as those in FIG. 11 have the same reference numerals.

In a default value list 1201, a finish size has been selected as A4, as has been selected in the selection bar 1102 of FIG. 11. Therefore, a list of default values (recommended values)

for the case when the finish size is A4, such as cover size, body size, cover image position, trimming position, etc. are displayed.

FIG. 13 is a diagram illustrating an example of a display screen for default values during setting of a body sheet size for bookbinding according to the embodiment of the present invention, and previously described keys that realize the same functions as those in FIG. 11 have the same reference numerals.

In a default value list 1301, a finish size has been selected as A4 (in FIG. 11), and a cover sheet size (440×297 mm) has been selected in FIG. 12, as selected in the selection bar 1102 of FIG. 12. For this reason, a list of default values (recommended values) that satisfy both a finish size of A4 and a cover size of (440×297 mm) for body sheet size, cover image position, trimming position, etc. are displayed in FIG. 13.

The processing of step S17 of FIG. 6B will be explained under the assumptions explained above and with reference to a flowchart of FIG. 7 below.

Figure 7:
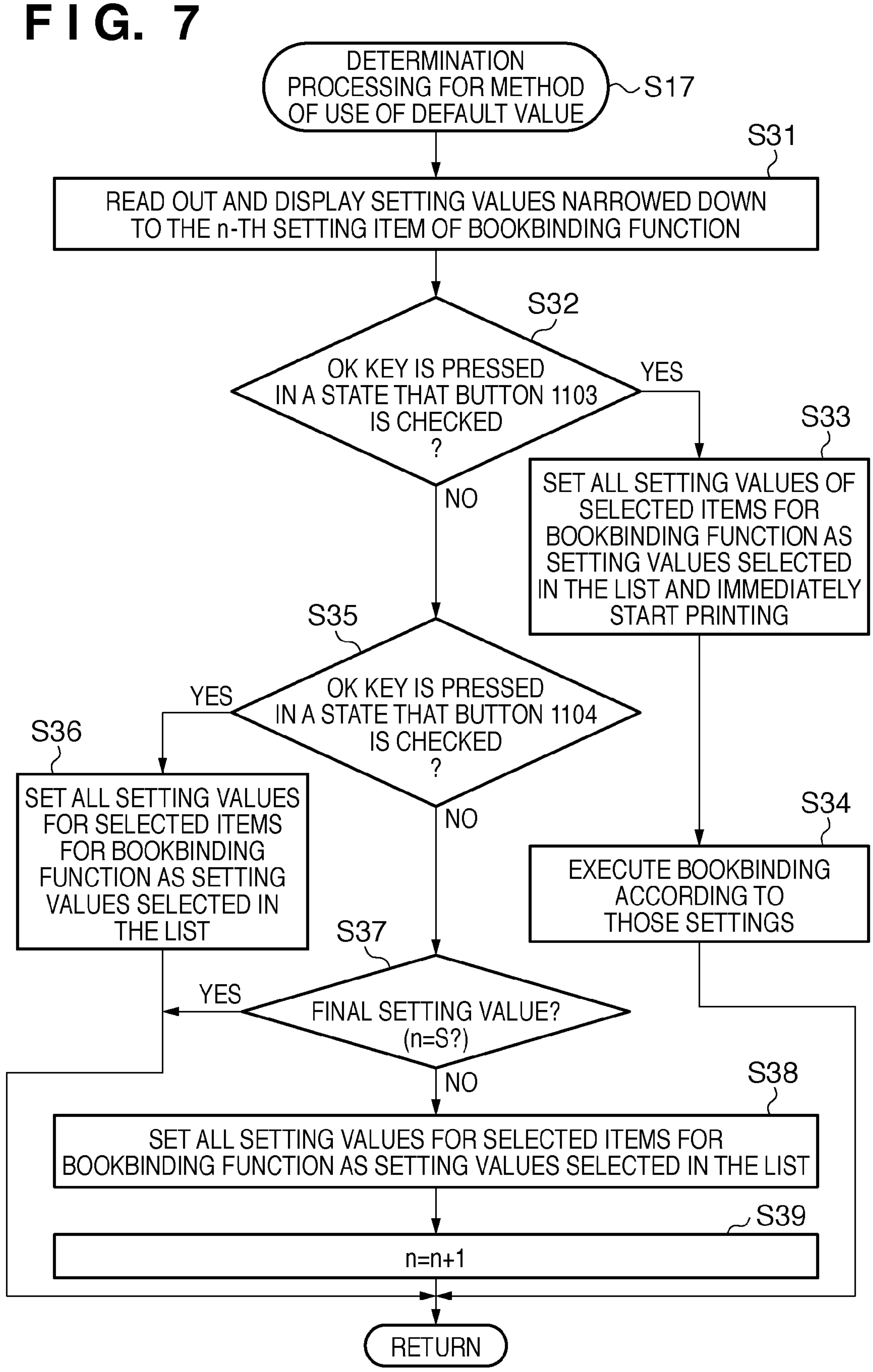
FIG. 7 is a flowchart explaining processing related to a method of use for default values in step S17 of FIG. 6B.

FIG. 7 is a flowchart explaining processing relating to a method of use for default values of step S17 of FIG. 6B. This processing is executed in step S16 when default values for bookbinding are displayed, and in step S20 when default value display is set during a warning for bookbinding.

First, in step S31, setting values for bookbinding functions narrowed down to the n-th setting item are read and displayed as a list, as shown in FIGS. 11 to 13. When executing such narrowing down, values are narrowed down such that they are consistent with set selection values before the n-th setting value. For example, in FIG. 12, because a finish size is determined to be "A4", setting after cover size can be done. Further, in FIG. 13, because a finish size is determined to be "A4" and a cover size is determined to be (400×297), settings after body sheet size can be done. Further, when executing this narrowing down, set items on the printing apparatus 100 such as sheet attributes, number of sheets, and other media types for each sheet to be used for a cover and body are targets for narrowing down.

Next, the process advances to step S32, and it is determined whether or not an "OK" key 1108 is pressed in a state of that the button 1103 displayed in FIGS. 11 to 13 is checked. If YES, the process advances to step S33, setting values selected in the selection bar 1102 for all selected items are set for bookbinding, and printing is immediately started. Next, the process advances to step S34, and bookbinding processing is executed on sheets printed in step S33 according to setting values set in step S33.

On the other hand, if it is determined in step S32 that the button 1103 is not checked, the process advances to step S35, and it is determined whether or not an "OK" key 1108 is pressed in a state that the button 1104 displayed in any one of FIGS. 11 to 13 is checked. If YES, the process advances to step S36, all setting values for selected items pertaining to bookbinding functions are set to setting values selected in the list displayed in any of FIGS. 11 to 13, and the process returns to the corresponding setting screen (any one of FIGS. 8 to 10). Therefore, in step S31, if the list shown in FIG. 11 is displayed, then the process returns to the setting screen for finish size shown in FIG. 8. At this time each setting value selected in the selection bar 1102 of FIG. 11 is set to setting values for finish, cover and body. Further, in step S31, if the list shown in FIG. 13 is displayed then the process returns to the setting screen for body sheet size shown in FIG. 10. At this time, because finish size and cover size have been selected in FIG. 13, the body sheet setting becomes the setting value selected by the selection bar 1102 of FIG. 13.

In this way, when setting for each process in bookbinding is executed, each item can be set while confirming that set values are appropriate, or while referring to recommended values (default values) for setting values. For this reason, even a user who is not used to the operation can set appropriate values and execute bookbinding.

On the other hand, when the button 1104 is not checked in step S35, the process advances to step S37, and it is determined whether the value of a variable n is equal to the number of general items S, and if the value of the variable n is equal to the number of general items S, then setting for all items for bookbinding are complete and the processing is ended. On the other hand, if the value of the variable n is less than the number of general items S, then the process advances to step S38, and the setting value selected in the list of any one of FIGS. 11 to 13 is set as the setting value for the n-th selection item for bookbinding. For example, if n=1, finish size selected in FIG. 11 is set as "A4", and the process advances to step S39. If n=2, cover size selected in FIG. 12 is set as "440×297", and the process advances to step S39. In step S39, the value of the variable n is incremented by 1, and the process returns to the original routine.

Moreover, although an example of a setting sequence for bookbinding is given in the present embodiment, the present invention is not limited to bookbinding.

With the embodiment of the present invention explained above, when setting each type of item for post-processing functions (finishing) that require complicated setting, even a user with little knowledge and experience can refer to default values and job log setting values and easily execute appropriate setting. Further, by using or referring to default values or values based on job log, repetitive input of trial-and-error values can be avoided. Further, the trouble of repetitively inputting the same setting values is eliminated, and input errors can be avoided.

Further, the user can call out and refer to a default value guide at an arbitrary timing. Further, according to the item currently being set, by changing the display form of succeeding item default values, readability of default values increases and the user can more easily select necessary setting values.

Further, because default values are dynamically calculated, default values coupled with inherent characteristics of the device can be created and registered. Thus, more appropriate setting can easily be executed. In this way, operability of finishing processing that has complicated functions can be increased, and overall productivity can be increased as a result.

OTHER EMBODIMENTS

The present invention can also be achieved by directly or remotely supplying a software program that realizes the functionality of the abovementioned embodiment to a system or device, whereupon a computer in the system or device reads out and executes the supplied program. In such a case, the format does not necessarily need to be a program, as long as it has the functionality of a program.

Accordingly, the program code itself, installed in a computer so as to realize the functional processing of the present invention through a computer, also realizes the present invention. In other words, the computer program itself, for realizing the functional processing of the present invention, is also included within the scope of the claims of the present invention. In this case, a program may be in any form, and object code, a program executed through an interpreter, script data supplied to an OS, or the like may be used, as long as it has the functionality of the program.

Various storage media can be used for supplying the program. Examples thereof include a Floppy® disk, a hard disk, an optical disk, a magneto-optical disk, an MO, a CD-ROM, a CD-R, a CD-RW, magnetic tape, a non-volatile memory card, a ROM, a DVD (DVD-ROM, DVD-R), and so on.

Alternatively, using a browser of a client computer to connect to an Internet homepage and downloading the computer program of the present invention to a storage medium such as a hard disk can be given as another method for supplying the program. In this case, the downloaded item may be the computer program of the present invention itself or a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the claims of the present invention.

In addition, the program of the present invention may be encrypted, stored in a storage medium such as a CD-ROM or the like, and distributed to a user. In this case, a user that has cleared a predetermined condition is allowed to download key information for removing the cryptography from a homepage via the Internet, use the key information to decrypt the program into an executable format, and install the program on a computer.

In addition to a computer realizing the functionality of the aforementioned embodiments by executing a read-out program, the functionality of the embodiments may be realized through another form. For example, an OS or the like running on the computer can perform part or all of the actual processing based on instructions from the program, and the functionality of the aforementioned embodiments can be realized through this processing.

Furthermore, the program read out from the storage medium may be written into a memory provided in a function expansion board installed in the computer or a function expansion unit connected to the computer. In this case, after the program has been written into the function expansion board, function expansion unit, or the like, a CPU or the like provided in the function expansion board, function expansion unit, or the like executes part or all of the actual processing based on instructions of the program, and the functionality of the aforementioned embodiments can be realized through this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-302078, filed Nov. 21, 2007, which is hereby incorporated by reference herein in its entirety.

What is claimed is:

1. A job processing apparatus comprising:

a display unit configured to display a first setting screen for receiving a first setting value for a job, and to display a second setting screen which is different from the first setting screen, the second setting screen being displayed for receiving a second setting value for the job after receiving the first setting value on the first setting screen;

a recommended setting display unit configured to display a first recommended setting value for the first setting value and a second recommended setting value for the second setting value; and a control unit configured to set, in a case where setting of both the first recommended setting value and the second recommended setting value as the first setting value and the second setting value, respectively, is instructed, the first recommended setting value as the first setting value and the second recommended setting value as the second setting value, and then control the display unit to display the second setting screen on which the second recommended setting value is set for the second setting value.

2. An apparatus according to claim 1, wherein the control unit sets, in a case where setting of only the first recommended setting value is instructed, the first recommended setting value as the first setting value and then controls the display unit to display the second setting screen on which the second recommended setting value is not set for the second setting value.

3. An apparatus according to claim 1, further comprising a determining unit configured to determine whether a first setting value input via the first setting screen without using the first recommended setting value and the second recommended setting value is permitted to be input, wherein the control unit controls the display unit to display a warning screen in a case where the determining unit determines the first setting value input via the first setting screen is permitted to be input.

4. An apparatus according to claim 3, wherein the warning screen includes a button for receiving the instruction for displaying the first recommended setting value and the second recommended setting value.

5. An apparatus according to claim 1, wherein the first and second setting values are setting values relating to a post process function.

6. An apparatus according to claim 1, wherein the first recommended setting value and the second recommended setting value are acquired from a setting history of setting values.

7. A control method of a job processing apparatus, comprising:

displaying a first setting screen for receiving a first setting value for a job, and displaying a second setting screen which is different from the first setting screen, the second setting screen being displayed for receiving a second setting value for the job after receiving the first setting value on the first setting screen;

displaying a first recommended setting value for the first setting value and a second recommended setting value for the second setting value; and setting, in a case where setting of both the first recommended setting value and the second recommended setting value as the first setting value and the second setting value, respectively, is instructed, the first recommended setting value as the first setting value and the second recommended setting as the second setting value and then displaying the second setting screen on which the second recommended setting value is set for the second setting value.

8. A method according to claim 7, wherein, in a case where setting of only the first recommended setting value is instructed, the first recommended setting value is set as the first setting value and then the second setting screen on which the second recommended setting value is not set for the second setting value is displayed.

9. A method according to claim 7, wherein the first and second setting values are setting values relating to a post process function.

10. A method according to claim 7, wherein the first and second recommended setting values are acquired from a setting history of setting values.

11. A non-transitory computer readable storage medium for storing a computer executable program for causing a computer to implement a control method according to claim 7.

* * * * *